US008515809B2

(12) United States Patent
Jambunathan et al.

(10) Patent No.: US 8,515,809 B2
(45) Date of Patent: Aug. 20, 2013

(54) DYNAMIC MODIFICATION OF ADVERTISEMENTS DISPLAYED IN RESPONSE TO A SEARCH ENGINE QUERY (75) Inventors: Sivakumar Jambunathan, Round Rock, TX (US); Indran Naick, Cedar Park, TX (US); Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1950 days.

(21) Appl. No.: 11/609,642

(22) Filed: Dec. 12, 2006

(65) Prior Publication Data
US 2008/0140521 A1 Jun. 12, 2008

(51) Int. Cl.
G06Q 30/00 (2006.01)
(52) U.S. Cl.
USPC ..................... 705/14.4; 705/14.54
(58) Field of Classification Search
USPC ........................ 705/14, 14.4, 14.54
See application file for complete search history.

(56) References Cited

U.S. PATENT DOCUMENTS

| | | | |
|---|---|---|---|
| 6,285,985 B1 | 9/2001 | Horstmann | |
| 6,876,997 B1 * | 4/2005 | Rorex et al. | 707/3 |
| 6,895,387 B1 | 5/2005 | Roberts et al. | |
| 6,928,413 B1 | 8/2005 | Pulitzer | |
| 7,089,195 B2 | 8/2006 | Rosenberg | |
| 7,765,206 B2 | 7/2010 | Hillis et al. | |
| 7,783,085 B2 | 8/2010 | Perlmutter et al. | |
| 8,117,072 B2 | 2/2012 | Kim et al. | |
| 2001/0034654 A1 | 10/2001 | Vigil et al. | |
| 2004/0059727 A1 | 3/2004 | Yano et al. | |
| 2004/0098380 A1 | 5/2004 | Dentel et al. | |
| 2004/0199419 A1 | 10/2004 | Kim et al. | |
| 2004/0210602 A1 | 10/2004 | Hillis et al. | |
| 2006/0036565 A1 | 2/2006 | Bruecken | |
| 2006/0053048 A1 * | 3/2006 | Tandetnik | 705/14 |
| 2007/0027750 A1 * | 2/2007 | Chou | 705/14 |
| 2007/0266025 A1 | 11/2007 | Wagner et al. | |
| 2008/0005068 A1 | 1/2008 | Dumais et al. | |
| 2008/0077533 A1 | 3/2008 | Oshima et al. | |
| 2009/0034805 A1 | 2/2009 | Perlmutter et al. | |

OTHER PUBLICATIONS

U.S. Appl. No. 11/534,304, filed Sep. 22, 2006, Jambunathan et al.
USPTO office action for U.S. Appl. No. 11/534,304 (AUS920060625US1) dated Mar. 18, 2009.
USPTO office action for U.S. Appl. No. 11/534,304 (AUS920060625US1) dated Jul. 11, 2008.

* cited by examiner

*Primary Examiner* — Michael Bekerman
*Assistant Examiner* — Mario Iosif
(74) *Attorney, Agent, or Firm* — Yee & Associates, P.C.; Arthur J. Samodovitz

(57) ABSTRACT

A computer implemented method, apparatus, and computer program product for modifying advertisements. A set of keywords is received from a user. A query is performed in a search engine with the set of keywords. A set of websites comprising ranked search results and ranked advertisements is displayed. Responsive to detecting a user input selecting a first website in the set of websites, modifying the ranked advertisements, based on the content of the first website, to form modified advertisements.

18 Claims, 4 Drawing Sheets

DYNAMIC MODIFICATION OF ADVERTISEMENTS DISPLAYED IN RESPONSE TO A SEARCH ENGINE QUERY

BACKGROUND OF THE INVENTION

1. Field of the Invention

The present invention relates generally to data processing systems and in particular to search engines. Still more particularly, the present invention relates to a computer implemented method, apparatus, and computer usable program code for dynamic modification of advertisements displayed in response to a search engine query.

2. Description of the Related Art

The Internet contains a large number of websites. When a user wants to locate a website containing specific content, but the user does not know which website to visit, the user typically uses a search engine. A search engine is a software program which indexes websites based on the content of each website and provides an interface in which the user can use to search the index and find websites with specific content. For example, a user may enter one or more keywords, and the search engine will return a list of all websites having content containing the specified keywords.

When a user performs a query using an Internet search engine, the search engine generates revenue for the owner of the search engine by displaying advertisements next to the results of the search engine query. The results of a search engine query are based on the keywords used in the search. Similarly, the advertisements which are displayed next to the search engine results are also based on the keywords used in the search.

When a user enters a keyword which has more than one meaning, the search engine returns search results which display websites having content related to each different meaning of the keyword. The search engine also displays advertisements corresponding to each different meaning of the keyword. Currently, when a keyword in a search engine query has more than one meaning, the advertisements displayed in response to the search engine query are not tailored to the meaning of the keyword which interests the user.

SUMMARY OF THE INVENTION

The illustrative embodiments described herein provide a computer implemented method, apparatus, and computer usable program code for modifying advertisements. A set of keywords is received from a user. A query is performed in a search engine with the set of keywords. A set of websites comprising ranked search results and ranked advertisements is displayed. Responsive to detecting a user input selecting a first website in the set of websites, modifying the ranked advertisements, based on the content of the first website, to form modified advertisements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
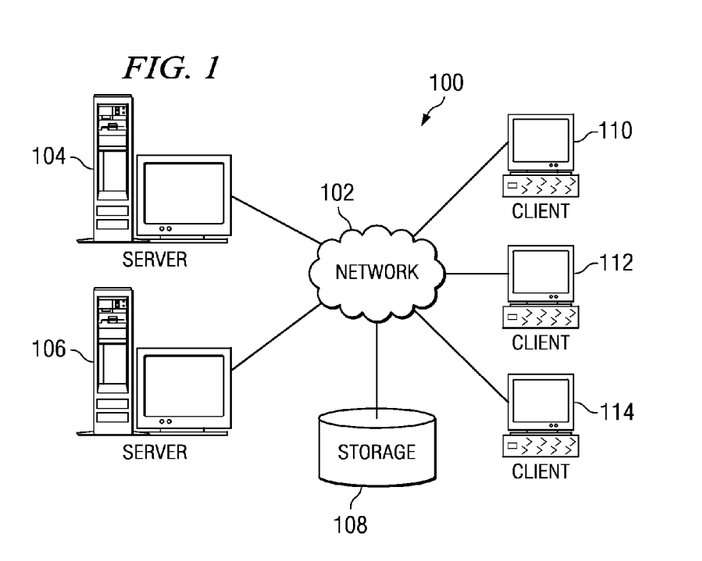
FIG. 1 depicts a pictorial representation of a network of data processing systems in accordance with an illustrative embodiment.
Figure 2:
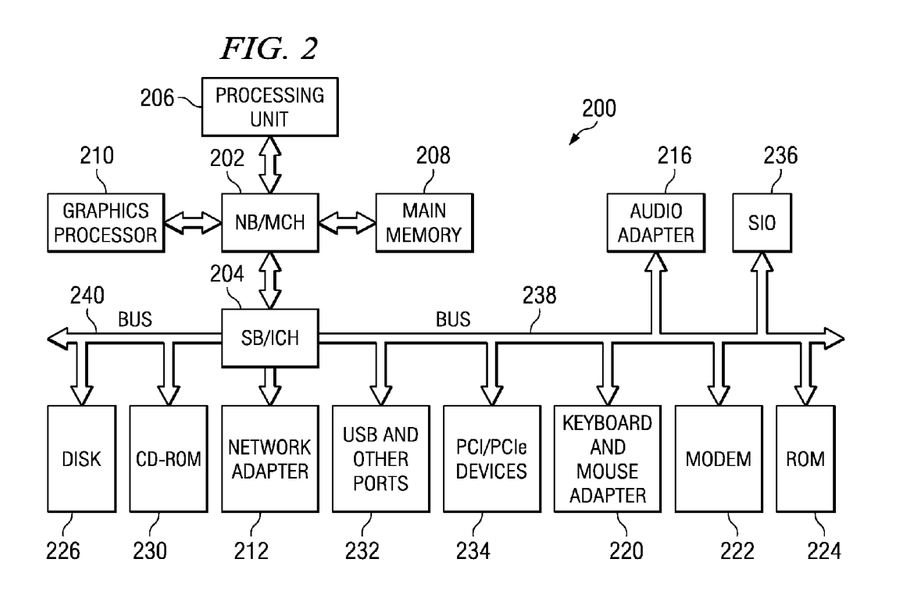
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The Internet contains a large number of websites. When a user wants to locate a website containing specific content, the user typically uses an Internet search engine on a computer, such as client 110 of FIG. 1. A search engine is a software program which indexes websites based on the content of each website and provides an interface in which the user can use to search the index and find websites with specific content. The search engine is typically located on a server, such as server 104 of FIG. 1. For example, a user may enter a set of keywords, where the set of keywords is one or more keywords, and the search engine will return a list of all websites with content related to the set of keywords.

When a user performs a query using an Internet search engine, the search engine generates revenue for the owner of the search engine by displaying advertisements next to the results of the search engine query. The results of a search engine query are based on the keywords used in the search. Similarly, the advertisements which are displayed next to the search engine results are also based on the keywords used in the search.

When a user performs a query of a search engine using one or more keywords, the search engine returns results from the search and advertisements. The results and advertisements are each ranked by the search engine. The ranked search results are results ordered by the search engine based on certain criteria. Similarly, the ranked advertisements are advertisements ordered by the search engine based on certain criteria. The criteria for ranking the search results and the criteria for ranking the advertisements are typically, but not necessarily, different.

The rank of each result or advertisement determines the order in which the results and advertisements are displayed in the browser. The higher the rank of a result or advertisement, the higher the result or advertisement is placed when displayed in the browser. Similarly, the lower the rank of a result or advertisement, the lower the result or advertisement is displayed in the browser.

The results obtained by the search engine are links to websites containing content that the search engine considers relevant to the keywords the user entered. Thus, a website is ranked higher if the search engine considers the website to be more relevant to the keywords. The search engine ranks the websites in the results based on the relevance of the content of the websites to the keywords. The relevance of the results to the keywords is determined by the search engine using various criteria.

For example, the search engine may weigh different criteria, such as the number of times the keywords occur on the website, the popularity of the website, and how many other websites link to the website in determining the relevance of the website to the keywords. Therefore, a search result website is ranked higher or lower depending on whether the search engine considers the content of the website more relevant or less relevant, respectively, to the keywords.

The search engine also ranks the advertisements which are displayed next to the results of the search. The advertisements are links to websites containing products or services related to the keywords. The advertiser typically pays the search engine provider to display the advertisements next to the search results. For example, the advertiser may pay the search engine a flat fee to display the website whenever certain keywords are entered into the search engine, or the advertiser may pay the search engine only if the user actually visits the website of the advertiser.

In determining the ranking of an advertisement, the search engine may take into account different criteria, such as how many times the keywords occur on the website of the advertiser, and how much money the advertiser is paying the search engine. For example, if the websites of two advertisers are equally relevant in other respects, the advertiser paying more money may be ranked higher than the advertiser paying less money.

Once the search engine has ranked the results and the advertisements, the links to the websites of the ranked results and the links to the websites of the ranked advertisements are sent to the browser and displayed to the user.

For example, assume a user wants to search for websites containing information about restaurants serving East Indian food in Dallas, Tex. The user may enter the keywords "Indian restaurant Dallas" in the search engine and submit a query looking for websites containing all three keywords. In response to the user query, the search engine will display a list of websites containing all three of the specified keywords, and the search engine may also display advertisements for restaurants serving Indian food in Dallas.

When a user enters a keyword in a search engine to find information about a particular topic, and the keyword has more than one meaning, the search engine may return search results containing several groups of websites. Each group of websites may contain content related to each different meaning of the keyword. The search engine may also display groups of advertisements with each group of advertisements corresponding to each different meaning of the keyword.

When a keyword in a search engine query has more than one meaning, the advertisements would be more relevant to the user if the advertisements were tailored to the particular topic the user was searching for.—Therefore, the illustrative embodiments described herein provide a computer implemented method, apparatus, and computer usable program code for modifying the type of advertisements in response to a search engine query.

The illustrative embodiments described herein provide a computer implemented method, apparatus, and computer usable program code for modifying advertisements. A set of keywords is received from a user. A query is performed in a search engine with the set of keywords. A set of websites comprising ranked search results and ranked advertisements is displayed. Responsive to detecting a user input selecting a first website in the set of websites, modifying the ranked advertisements, based on the content of the first website, to form modified advertisements.

Figure 3:
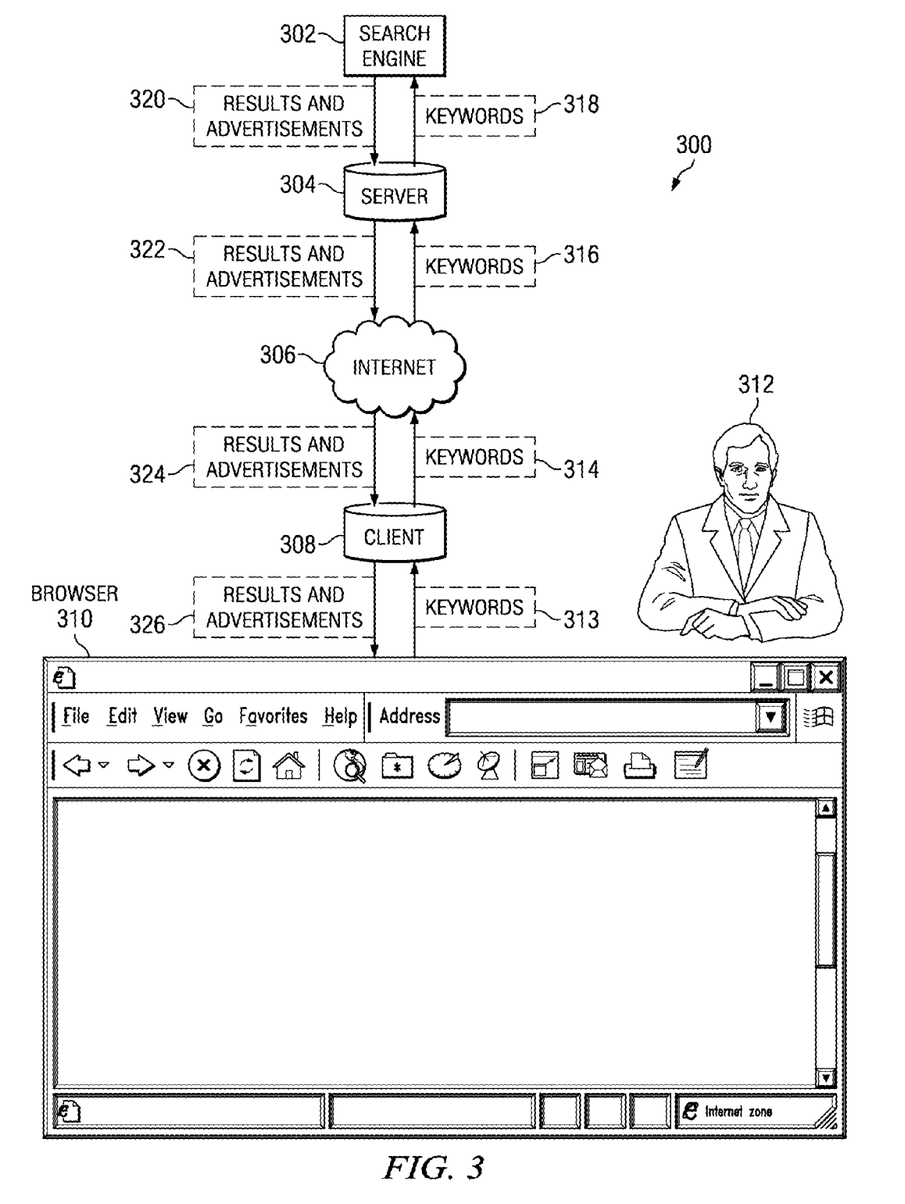
FIG. 3 is a block diagram of software components used to dynamically select advertisements in accordance with an illustrative embodiment.

FIG. 3 is a block diagram of software components used to dynamically select advertisements in accordance with an illustrative embodiment. In software components 300, search engine 302 is software running on server 304. Server 304 is connected to Internet 306. Client 308 is also connected to Internet 306. Browser 310 is software running on client 308.

User 312 interacts with browser 310. For example, user 312 may use browser 310 to navigate to the website of search engine 302. Search engine 302 is a website for searching the contents of the internet, such as Google™, Yahoo®, or MSN Search®.

User 312 types in keywords into browser 310 so that search engine 302 can find and display websites with content related to the keywords. For example, assume user 312 navigates to the website of search engine 302 and then types keywords into browser 310. Browser 310 sends keywords 313 to client 308, and client 308 sends keywords 314 across Internet 306. Internet 306 delivers keywords 316 to server 304. Server 304 sends keywords 318 to search engine 302.

Search engine 302 receives keywords 318 and searches the index on server 304 for websites containing information about the keyword. Search engine 302 also determines which advertisements the search engine should provide for the user. The search engine ranks the results and ranks the advertisements using various criteria.

Search engine 302 sends the results of the search, results and advertisements 320, to server 304. Server 304 sends results and advertisements 322 to Internet 306. Internet 306 sends results and advertisements 324 to client 308, and client 308 sends results and advertisements 326 to browser 310.

Browser 310 then displays the search results and the advertisements to user 312 using the rankings which the search engine determined for the results and the advertisements. Search engine 302 can further modify the ranking of the advertisements based on the websites which user 312 visits after the initial search results and advertisements are displayed.

Figure 4:
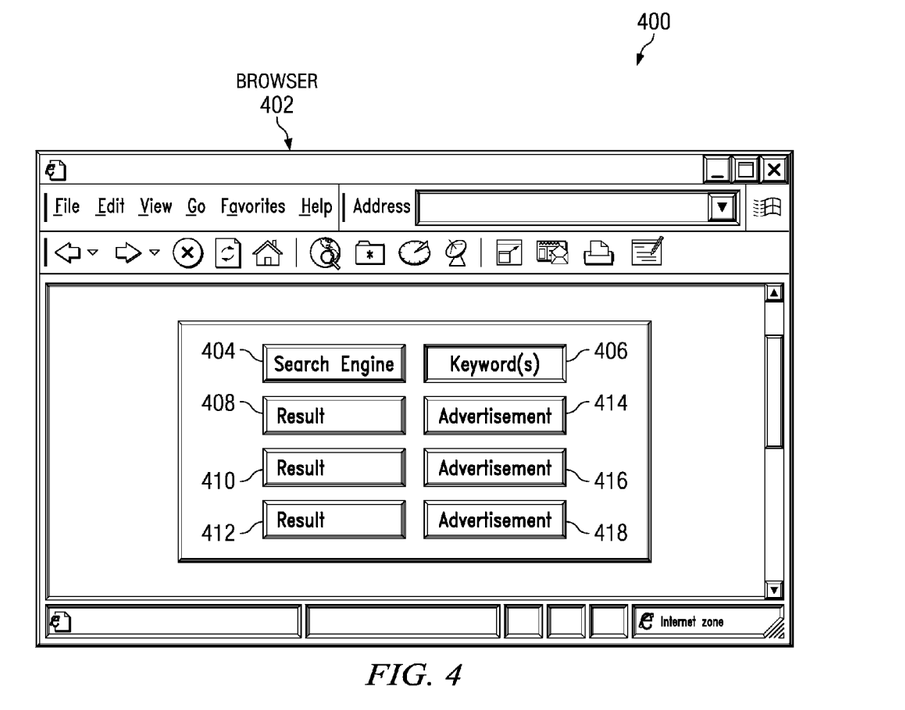
FIG. 4 depicts a browser window in accordance with an illustrative embodiment.

FIG. 4 depicts a browser window in accordance with an illustrative embodiment. In browser window 400, browser 402 is an Internet browser, in which a user has gone to search engine 404 and performed a search engine query using keyword 406. Browser 402 may be a browser, such as browser 310 in FIG. 3, and search engine 404 may be a search engine, such as search engine 302 in FIG. 3.

In this example, only one keyword, keyword 406, is shown. However, those versed in the art will appreciate that keyword searches may contain multiple keywords and Boolean operators specifying how the search should be performed and that the techniques disclosed for use with one keyword may be applied to multiple keyword searches.

In this example, keyword 406 has three different and distinct meanings which keyword 406 is commonly used to convey. The three meanings in this example are purely for illustration purposes. Those versed in the art will appreciate that the embodiments may be used for any set of keywords with more than one meaning.

In this example, keyword 406 has three meanings. One meaning is most relevant to the user while the other two meanings are less relevant. Relevant means that the user is particularly interested in one meaning of keyword 406 and is not as interested in the other two meanings of keyword 406. A first meaning of keyword 406 is more relevant than a second or third meaning when the first meaning is what the user intended when initiating the keyword search using the search engine.

In response to the query, search engine 404 initially returns three sets of results, results 408, 410, and 412. Initial results 408, 410 and 412 are ranked by the search engine based on the relevancy of results 408, 410, and 412 to keyword 406. The set of websites most relevant to keyword 406 are ranked the highest and displayed on top, in result 408, and the least relevant set of websites are ranked lower and displayed on the bottom, in result 412.

Result 408 represents a first set of websites related to the first common meaning of keyword 406, where a set is a list of one or more websites. Result 410 represents a second set of websites related to the second common meaning of keyword 406. Result 412 represents a third set of websites related to the third common meaning of keyword 406.

In response to the query, search engine 404 also displays three sets of advertisements, advertisement 414, 416 and 418, based on the ranking of the advertisements by the search engine. Advertisement 414 represents a first set of advertising ranked highest because the advertising is related to the first common meaning of keyword 406. Advertisement 416 is ranked lower because advertisement 416 is related to the second common meaning of keyword 406. Advertisement 418 is ranked lowest because advertisement 418 is related to the third common meaning of keyword 406. Advertisements 414, 416, and 418 are ranked by the search engine in the order of relevance to keyword 406 based on the initial query. The set of advertisements ranked most relevant to keyword 406 are displayed on top, in advertisements 414, and the least relevant set of websites are displayed on the bottom, in advertisements 418.

An advertisement, such as advertisement 414, 416, or 418, is usually several lines of text designed to catch the interest of the reader, and a hyperlink to a website, where the advertiser has more information on the advertiser's products or services. The advertisement may also contain a picture or other graphic image.

The user may only be interested in the third meaning of keyword 406 but is initially shown advertisements related to all three meanings of keyword 406. The user views results 408, 410 and 412 and determines that result 412 is related to the third meaning of keyword 406 and therefore of interest to the user. The third meaning of keyword 406 is, in this example, most relevant to the user.

After submitting a query to the search engine using keyword 406, the user may visit a website in results 408, 410, and 412 or a website in advertisements 414, 416, or 418. The user typically visits the websites which contain content related to the meaning of the keyword which is more relevant to the user.

For example, after the user determines that result 412 is the meaning of keyword 406 which the user is interested in, the user may click on websites belonging to the set of websites in result 412, or the user may click on a website in advertisement 418 because the website is relevant to the meaning of keyword 406 which the user is interested in. Based on the websites which the user visits after the initial search results are displayed, the search engine can determine which meaning or meanings of keyword 406 are most relevant to the user.

Typically, after a user visits a website in results 408, 410, and 412 or advertisements 414, 416, or 418, the user clicks on the "back" button of browser 402 to return to the search engine results shown in browser 402 so that the user can visit additional websites from the results or the advertisements. When the user returns to the search engine results page, the search engine may modify the ranking of the advertisements displayed based on the website which the user visited. The search engine can infer that the user is interested in the meaning of keyword 406 which is related to the content of the website which the user visited.

For example, assume the user is interested in the third meaning of keyword 406. After the initial search, the user visits a website in the set of websites belonging to result 412. When the user returns to the search page, the search engine modifies advertisements 414, 416, and 418 based on the content of the website which the user visited.

The modified advertisements may be the original advertisements but displayed in a different order, or the modified advertisements may have some of the original advertisements removed and new, more relevant, advertisements added. The modifications to the displayed advertisements are made based on which advertisements the search engine ranks higher and based on the websites the user visits after the initial search engine query.

In this example, the search engine determines that the third meaning of keyword 406 is relevant to the user based on websites which the user clicked on after the initial search results were displayed. When the user returns to the search engine results page, the search engine modifies the order in which the advertisements are displayed and ranks advertisement 418 higher so that advertisement 418 is displayed at the top, followed by advertisement 414, and advertisement 416.

In addition, advertisement 414 or advertisement 416 may contain websites different than the websites displayed after the initial search. The different websites may be chosen based on the websites the user has visited after the initial search. Each time the user visits a website after the initial search results are displayed, the advertisements displayed on the search results page are modified. In this manner, the advertisements displayed may be fine-tuned to the interests of the users based on the websites which the user visits after the initial search.

The advertisements which are displayed in response to an Internet search engine query are dynamically modified based on the websites which the user visits. The websites which the user visits may belong to results 408, 410, and 412, advertisements 414, 416, and 418 or both the results and the advertisements. Each website which the user visits after the results of the search and the advertisements are displayed is used to further modify the displayed advertisements.

Thus, the displayed advertisements are dynamically modified each time the user returns to the webpage displaying the search results. Based on the website the user visited, a determination is made whether the currently displayed advertisements are relevant to the user, and the advertisements are modified and displayed as modified advertisements. New advertisements may be added to the displayed advertisements. Previously displayed advertisements may be removed from the displayed advertisements. The displayed advertisements may be re-ranked based on the relevance of the advertisements to the website the user visited.

In contrast, in a conventional system, the advertisements are not modified based on the websites which the user visits after the search results and advertisements are displayed. In a conventional system, the advertisements remain static and are displayed based on the initially determined relevance to the keywords. The advertisements continue to be displayed as the user visits different websites, even if the advertisements displayed are irrelevant to the user.

Figure 5:
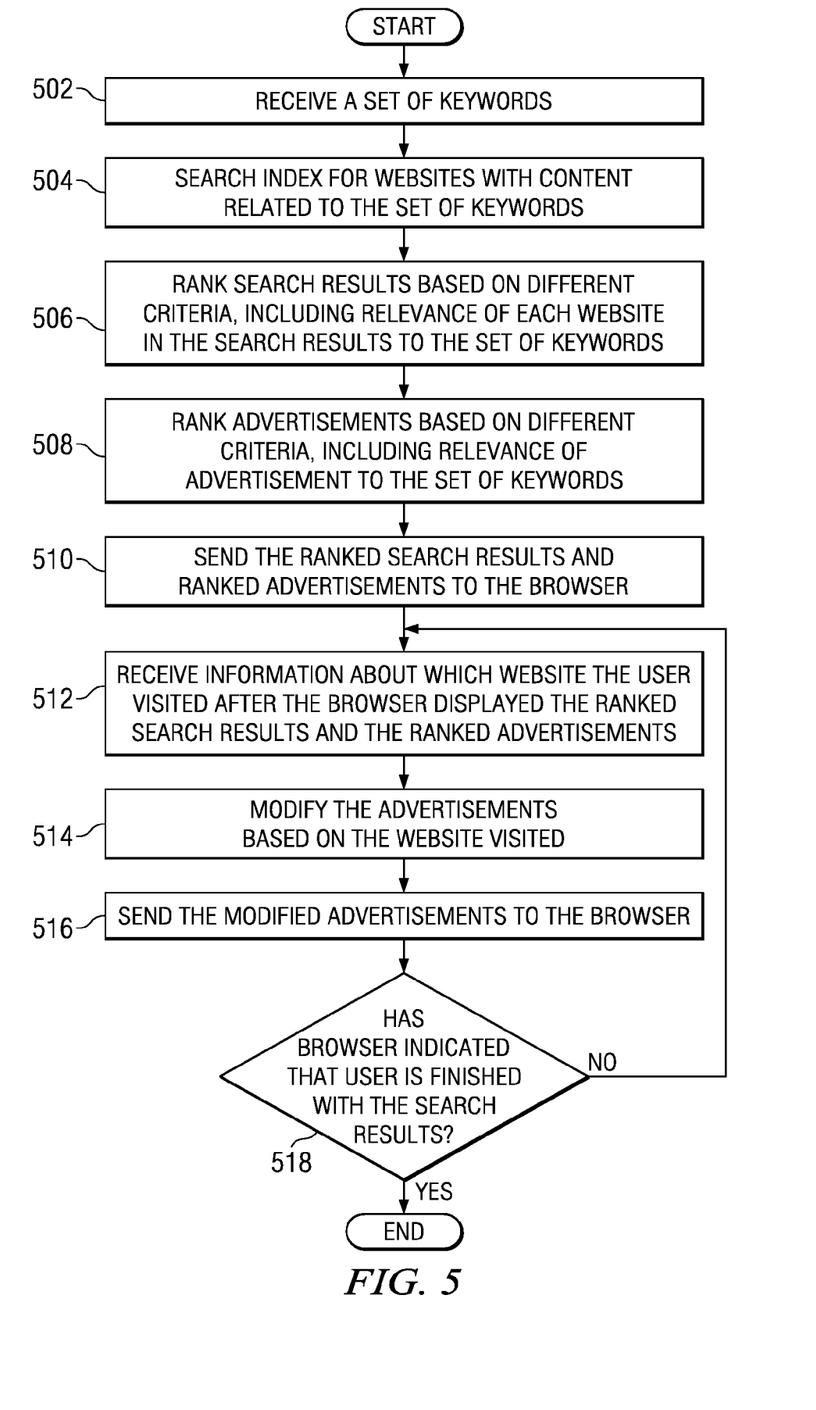
FIG. 5 is a flowchart of a process for a search engine in accordance with an illustrative embodiment.

FIG. 5 is a flowchart of a process for a search engine in accordance with an illustrative embodiment. The process in FIG. 5 is executed by software on a computer or server. For example, software, such as search engine 302 in FIG. 3, may perform the steps in the process.

The process begins when a set of keywords is received from a user (step 502). The set of keywords is one or more keywords. The search engine has an index for each website on the Internet, based on the content of each website. The set of keywords are used to search the index for websites with content related to the set of keywords (step 504).

The search results are ranked based on different criteria, including the relevance of the search results to the set of keywords (step 506). The advertisements are ranked based on different criteria, including the relevance of the search results to the user (step 508). The ranked search results and the ranked advertisements are sent to the browser of the user who typed in the keywords (step 510). The browser displays the search results and the advertisements.

The browser determines which website the user visits in the relevant search results or the relevant advertisements and sends a message. The search engine receives the information about which website the user has visited (step 512).

The advertisements are modified based on the website which the user visited to make the advertisements more relevant to the meaning of the keywords the user intended (step 514). The advertisements are modified by any combination of (1) adding new advertisements, (2) removing advertisements, or (3) re-ranking the advertisements which are displayed to change the order in which the advertisements are displayed.

If the order in which the advertisements are displayed is changed, the highest ranked advertisement, based on the relevance of the advertisement to the website the user visited, is displayed first. Similarly, if a new advertisement is added, the new advertisement is added based on the relevance of the new advertisement to the website the user visited. An advertisement which was initially displayed may be removed based on the relevance to the website the user visited.

The search results and the modified advertisements are sent by the search engine to the browser (step 516). A determination is made whether the user has completed the search (step 518). If the answer is "no" and the user has not finished with the search results, then the search engine receives more information on which websites the user visited (step 512) and the process repeats. If the answer is "yes" and the process has finished, then the process ends.

The different illustrative embodiments described herein provide a computer implemented method, apparatus, and computer usable program code for modifying advertisements in response to a search engine query. The illustrative embodiments described herein provide a computer implemented method, apparatus, and computer usable program code for modifying advertisements. A set of keywords is received from a user. A query is performed in a search engine with the set of keywords. A set of websites comprising ranked search results and ranked advertisements is displayed. Responsive to detecting a user input selecting a first website in the set of websites, modifying the ranked advertisements, based on the content of the first website, to form modified advertisements.

Advertisements and search results are initially displayed as a result of a search engine query. The user may visit a website in the search results or a website in the advertisements. The advertisements are dynamically modified each time the user visits a website and returns to the search results webpage. The dynamically modified advertisements result in advertisements which are relevant to the websites the user has visited after the initial search.

Because the dynamically modified advertisements are relevant to the websites which the user recently visited, the advertisements are more relevant to the user. Because the advertisements are more relevant to the user, the user is more likely to click on the advertisement and visit the website associated with the advertisement. Each time a user visits a website associated with an advertisement, more revenue is generated for the owner of the search engine.

Thus, dynamically modifying advertisements results in more revenue for the owner of the search engine. The user is also more satisfied with the search engine because the advertisements displayed more closely reflect the interests of the user.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for modifying advertisements, the computer implemented method comprising:
responsive to receiving a set of keywords from a user, performing, by a processing unit, a query in a search engine with the set of keywords;

responsive to performing the query in the search engine, displaying a set of websites comprising a plurality of ranked search results and a plurality of ranked advertisements;

responsive to detecting a user input selecting a first website in the set of websites, determining a content of the first website;

responsive to determining that the set of keywords has more than one possible meaning, determining, by a processing unit associated with the search engine, a meaning of the set of keywords relevant to the user based upon the content of the first website; and modifying a selection of the plurality of ranked advertisements, based on the meaning of the set of keywords determined, to form a modified selection of advertisements.

2. The computer implemented method of claim 1, further comprising:

responsive to another user input requesting a search results page, displaying the modified selection of advertisements to form displayed advertisements.

3. The computer implemented method of claim 2, further comprising:

responsive to detecting a user input selecting a second website in the set of websites, modifying a selection of the displayed advertisements to form a further modified selection of advertisements and displaying the further modified selection of advertisements.

4. The computer implemented method of claim 2, wherein the step of displaying the modified selection of advertisements comprises:

changing an order of advertisements in the modified selection of advertisements, wherein the order is based on the content of the first website.

5. The computer implemented method of claim 2, wherein the step of displaying the modified selection of advertisements comprises:

adding a new advertisement to the modified selection of advertisements based on the content of the first website.

6. The computer implemented method of claim 2, wherein modifying the selection of the plurality of ranked advertisements comprises:

removing an advertisement from the displayed advertisements based on the content of the first website.

7. A computer program product comprising a non-transitory computer usable medium including computer usable program code for modifying advertisements, the computer program product comprising:

responsive to receiving a set of keywords from a user, computer usable code for performing a query in a search engine with the set of keywords;

responsive to performing the query in the search engine, computer usable code for displaying a set of websites comprising a plurality of ranked search results and a plurality of ranked advertisements;

responsive to detecting a user input selecting a first website in the set of websites, computer usable code for determining a content of the first website;

responsive to determining that the set of keywords has more than one possible meaning, computer usable code for determining a meaning of the set of keywords relevant to the user based upon the content of the first website; and computer usable code for modifying a selection of the plurality of ranked advertisements, based on the meaning of the set of keywords determined, to form a modified selection of advertisements.

8. The computer program product of claim 7, further comprising:

responsive to another user input requesting a search results page, computer usable code for displaying the modified selection of advertisements to form displayed advertisements.

9. The computer program product of claim 8, further comprising:

responsive to detecting a user input selecting a second website in the set of websites, computer usable code for modifying a selection of the displayed advertisements to form a further modified selection of advertisements and computer usable code for displaying the further modified selection of advertisements.

10. The computer program product of claim 8, wherein computer usable code for displaying the modified selection of advertisements comprises:

computer usable code for changing an order of advertisements in the modified selection of advertisements, wherein the order is based on the content of the first website.

11. The computer program product of claim 8, wherein the computer usable code for displaying the modified selection of advertisements comprises:

computer usable code for adding a new advertisement to the modified selection of advertisements based on the content of the first website.

12. The computer program product of claim 8, wherein the computer usable code for modifying a selection of the plurality of ranked advertisements comprises:

computer usable code for removing an advertisement from the displayed advertisements based on the content of the first website.

13. A data processing system for modifying advertisements, the data processing system comprising:

a bus;

a storage device connected to the bus, wherein the storage device contains computer usable code;

a communications unit connected to the bus; and a processing unit connected to the bus for executing the computer usable code, wherein responsive to receiving a set of keywords from a user, the processing unit performs a query in a search engine with the set of keywords, displays a set of websites comprising a plurality of ranked search results and a plurality of ranked advertisements, responsive to detecting a user input selecting a first website in the set of websites, determines a content of the first website, responsive to determining that the set of keywords has more than one possible meaning, determines a meaning of the set of keywords relevant to the user based upon the content of the first website, and modifies a selection of the plurality of advertisements, based on the meaning of the set of keywords determined, to form a modified selection of advertisements.

14. The data processing system of claim 13, wherein the processing unit, responsive to another user input requesting a search results page, further executes the computer usable code to display the modified selection of advertisements to form displayed advertisements.

15. The data processing system of claim 14, wherein the processing unit, responsive to detecting a user input selecting a second website in the set of websites, further executes the computer usable code to modify a selection of the displayed advertisements to form a further modified selection of advertisements and display the further modified selection of advertisements.

16. The data processing system of claim 14, wherein the processing unit displays the modified selection of advertisements by changing an order of advertisements in the modified selection of advertisements, wherein the order is based on the content of the first website.

17. The data processing system of claim 14, wherein the processing unit displays the modified selection of advertisements by adding a new advertisement to the modified selection of advertisements based on the content of the first website.

18. The data processing system of claim 14, wherein processing unit modifies a selection of the plurality of ranked advertisements by removing an advertisement from the displayed advertisements based on the content of the first website.

* * * * *